US012733639B2

(12) United States Patent
Shannon et al.

(10) Patent No.: US 12,733,639 B2
(45) Date of Patent: Sep. 15, 2026

(54) HESPERALOE EXTRACT FOR FOLIAR USE

(71) Applicant: Kimberly-Clark Worldwide, Inc., Neenah, WI (US)

(72) Inventors: Thomas G. Shannon, Neenah, WI (US); Bo Shi, Neenah, WI (US); Ning Wei, Roswell, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 177 days.

(21) Appl. No.: 18/571,922

(22) PCT Filed: Jun. 21, 2021

(86) PCT No.: PCT/US2021/038284

§ 371 (c)(1), (2) Date: Dec. 19, 2023

(87) PCT Pub. No.: WO2022/271148

PCT Pub. Date: Dec. 29, 2022

(65) Prior Publication Data

US 2024/0292834 A1 Sep. 5, 2024

(51) Int. Cl.
*A01N 25/30* (2006.01)
*A01N 43/90* (2006.01)
*A01N 65/40* (2009.01)

(52) U.S. Cl.
CPC ............. *A01N 25/30* (2013.01); *A01N 43/90* (2013.01); *A01N 65/40* (2013.01)

(58) Field of Classification Search
CPC ........ A01N 25/30; A01N 43/90; A01N 65/40; A01N 65/42; C09K 23/017; C09K 23/56
See application file for complete search history.

(56) References Cited

U.S. PATENT DOCUMENTS 6,485,734 B1 11/2002 Baker et al.

FOREIGN PATENT DOCUMENTS

CN 101589714 A 12/2009
CN 102599151 A 7/2012
UA 100529 C2 * 1/2013 ............. A01N 45/02
WO 9641528 A1 12/1996
WO 2007139382 A2 12/2007
WO 2017095216 A1 6/2017

OTHER PUBLICATIONS

Isolation and structure of some steroidal sapogenins, J Am Chem Soc. 1943, 65, 6, 1199-1209 ; Marker et al (Year: 1943).*
Simmons-Boyce et al. (Natural Product Communications vol. 2 (1) 2007, pp. 99-114). (Year: 2007).*
Translation UA 100529, (Year: 2013).*
Bengtsson et al., Comparative Studies on the Effects of a Yucca Extract and Acibenzolar-S-Methyl (ASM) on Inhibition of Venturia Inaequalis in Apple Leaves, European Journal of Plant Pathology, vol. 124, No. 2, Dec. 7, 2008, 12 pages.
Marker et al., Steroidal Sapogenins. No. 171. Biogenesis of the Steroidal Sapogenins in Agaves, Manfreda and Hesperaloe, Journal of the American Chemical Society, vol. 69, No. 10, Oct. 1, 1947, pp. 2403-2404.
International Application No. PCT/US2021/038284, International Preliminary Report on Patentability, mailed on Jan. 4, 2024, 7 pages.
International Application No. PCT/US2021/038284, International Search Report and Written Opinion, mailed on Oct. 11, 2021, 9 pages.
Brazilian Patent Application No. BR112023026251-8 , "Office Action", Aug. 13, 2024, 4 pages.
European Patent Application No. 21947321.2, "Extended European Search Report", Apr. 16, 2025, 10 pages.
Kregiel et al., "Saponin-Based, Biological-Active Surfactants From Plants", Application and Characterization of Surfactants, Jul. 5, 2017, 24 pages.
Simmons-Boyce et al., "Saponins From Furcraea Selloa Var. Marginata", Fitoterapia, vol. 75, No. 7-8, Dec. 1, 2004, pp. 634-638.
Chilean Patent Application No. 202303756, "Office Action", Jun. 25, 2025, 15 pages.
Chilean Patent Application No. 202303756, "Second Office Action", Nov. 28, 2025, 32 pages.
Chilean Patent Application No. 2023-03756, "Office Action", Jun. 1, 2026, 7 pages.

* cited by examiner

*Primary Examiner* — Snigdha Maewall
(74) *Attorney, Agent, or Firm* — Kilpatrick Townsend & Stockton LLP

(57) ABSTRACT

Disclosed are natural surfactant compositions comprising saponins derived from non-woody plants of the genus *Hesperaloe*. The saponins are useful in the formulation of natural surfactant compositions and may be combined with other natural surfactants, such as alkyl polyglucosides active. The surfactant compositions may be used in agricultural composition, particularly aqueous foliar sprays, to improve the wetting properties of one or more active agents.

9 Claims, 4 Drawing Sheets

HESPERALOE EXTRACT FOR FOLIAR USE

CROSS-REFERENCE TO RELATED APPLICATION

This application is a U.S. national phase under 35 U.S.C. § 371 of International Patent Application No. PCT/US2021/038284, filed Jun. 21, 2021, which is incorporated herein by reference in its entirety for all intents and purposes.

BACKGROUND

Plants produce a vast and diverse assortment of organic compounds, the great majority of which do not appear to participate directly in their growth and development. These substances, traditionally referred to as secondary metabolites or plant natural products, often are distributed among limited taxonomic groups within the plant kingdom. The functions of secondary metabolites remain largely unknown, although a number of compounds have been associated with attributes useful to the plants e.g. protection against herbivores and protection against microbial infection, as attractants for pollinators and seed-dispersing animals, and as compounds that influence competition among plant species (allelochemicals). There is a growing interest in plant natural products, since these products often have a wide range of applications in different kinds of industries, including pharmaceutical industries, cosmetic industries, food industries, detergent industries, and the like.

A particular group of plant secondary metabolites of interest are saponins. Saponins are glycosylated compounds classified as either triterpenoids, steroids, or steroidal glycoalkaloids. Saponins consist of one or two sugar moieties which are coupled to the aglycon (mono- and bisdesmosides, respectively). Saponins can be hydrolyzed to sapogenins and sugar moieties by acid hydrolysis or enzymatic methods. Saponins are generally water soluble high molecular weight compounds with molecular weights ranging from 600 to more than 2,000 daltons.

The asymmetric distribution of their hydrophobic (aglycone) and hydrophilic (sugar) moieties confers an amphipathic character to these compounds which are largely responsible for their detergent-like properties. The ability of lowering surface tension makes saponins potentially well suited for use in the cosmetic and in the detergent industries.

Saponins also have the ability of forming insoluble complexes with cholesterol, which makes some of them suitable for use in the pharmaceutical industry as cholesterol lowering agents. Other saponins are associated with formation of immunostimulating complexes that are useful in vaccine strategies.

Currently, a major limitation to the broad exploitation of saponins is the fact that commercially available saponins are relatively expensive. The expenses is due in large part to the limited number of plant extracts having significant amounts of saponins. Currently, commercially available plant extracts containing saponins include *Saponaria officinalis, Quillaia* bark and stem, *Castanea sativa* seeds, and extracts of various *Yucca* species.

Plant extracts containing saponins are thus of general interest within a wide range of different industries. There is therefore a growing need in the art for alternative sources of saponin extracts and these plant sources should preferably be cheap, easy to obtain, and preferably the saponin content should be relatively high.

SUMMARY

The present inventors have now discovered that *Hesperaloe* biomass, particularly the above ground portion of a *Hesperaloe* plant and more particularly the portion of the *Hesperaloe* plant above the crown, may be processed prior to pulping to extract water soluble solids such as inorganic salts, saccharides and saponins.

Of particular interest are saponins derived from *Hesperaloe* biomass and their use as natural surfactants. The water soluble extractives of *Hesperaloe* generally comprise a mixture of saponins including 25(27)-dehydrofucreastatin (FIG. 2A), 5(6),25(27)-disdehydroyuccaloiside C (FIG. 2B), 5(6)-disdehydroyuccaloiside C (FIG. 2C), furcreastatin and yuccaloiside C. The saponins may be mixed with one or more active agents to improve the wetting properties of the mixture and/or improve the effectiveness of the active agent. In particularly preferred embodiments the saponins are mixed with an agrochemical to form an aqueous solution that may be applied by spraying to plants to improve resistance to a variety fungi, microorganisms, viruses, and pests or to improve growth of the plant.

In other embodiments saponins derived from *Hesperaloe* may be combined with a surfactant selected from amphoteric surfactants, cationic surfactants, anionic surfactants, non-ionic surfactants to synergistically increase the wetting properties of the combination/composition in comparison to the respective individual surfactants, which extends beyond the sum of the activity of both individual surfactants. For example, in one embodiment, the invention provides a surfactant composition comprising a saponin derived from *Hesperaloe* and a nonionic surfactant that enables an aqueous liquid containing the surfactant composition to achieve a surface tension below 30 mN/m at 20° C., such as less than 29.5 mN/m, 29 mN/m, 28.5 mN/m or 28 mN/m at 20° C.

In still other embodiments the invention provides an aqueous surfactant composition comprising one or more saponins extracted from a non-woody plant of the genus *Hesperaloe*, a surfactant selected from amphoteric surfactants, cationic surfactants, anionic surfactants, non-ionic surfactants, and water. In certain instances, it may be preferable that surfactant be a nonionic surfactant, particularly a natural nonionic surfactant such as, for example, an alkyl polyglucoside.

In yet other embodiments the invention provides a method of lowering the surface tension of an aqueous liquid, the method comprising the step of adding the surfactant composition comprising one or more saponins extracted from a non-woody plant of the genus *Hesperaloe* and a nonionic surfactant to the aqueous liquid.

In other embodiments the present invention provides an agricultural composition comprising surfactant composition comprising one or more saponins extracted from a non-woody plant of the genus *Hesperaloe*, a nonionic surfactant and an active agent selected from a pesticide, insecticide, acaricide, fungicide, nematocide, disinfectant, herbicide, fertilizer, or micronutrient.

In still another embodiment the present invention provides a natural foliar spray comprising a wetting composition comprising one or more saponins extracted from a non-woody plant of the genus *Hesperaloe*, a nonionic surfactant and water; and active agent selected from a pesticide, insecticide, acaricide, fungicide, nematocide, disinfectant, herbicide, fertilizer or micronutrient.

DESCRIPTION OF THE DRAWINGS

FIGS. 1A and 1B illustrate a triterpenoid saponin and a steroidal saponin, respectively;

Figure 2A:
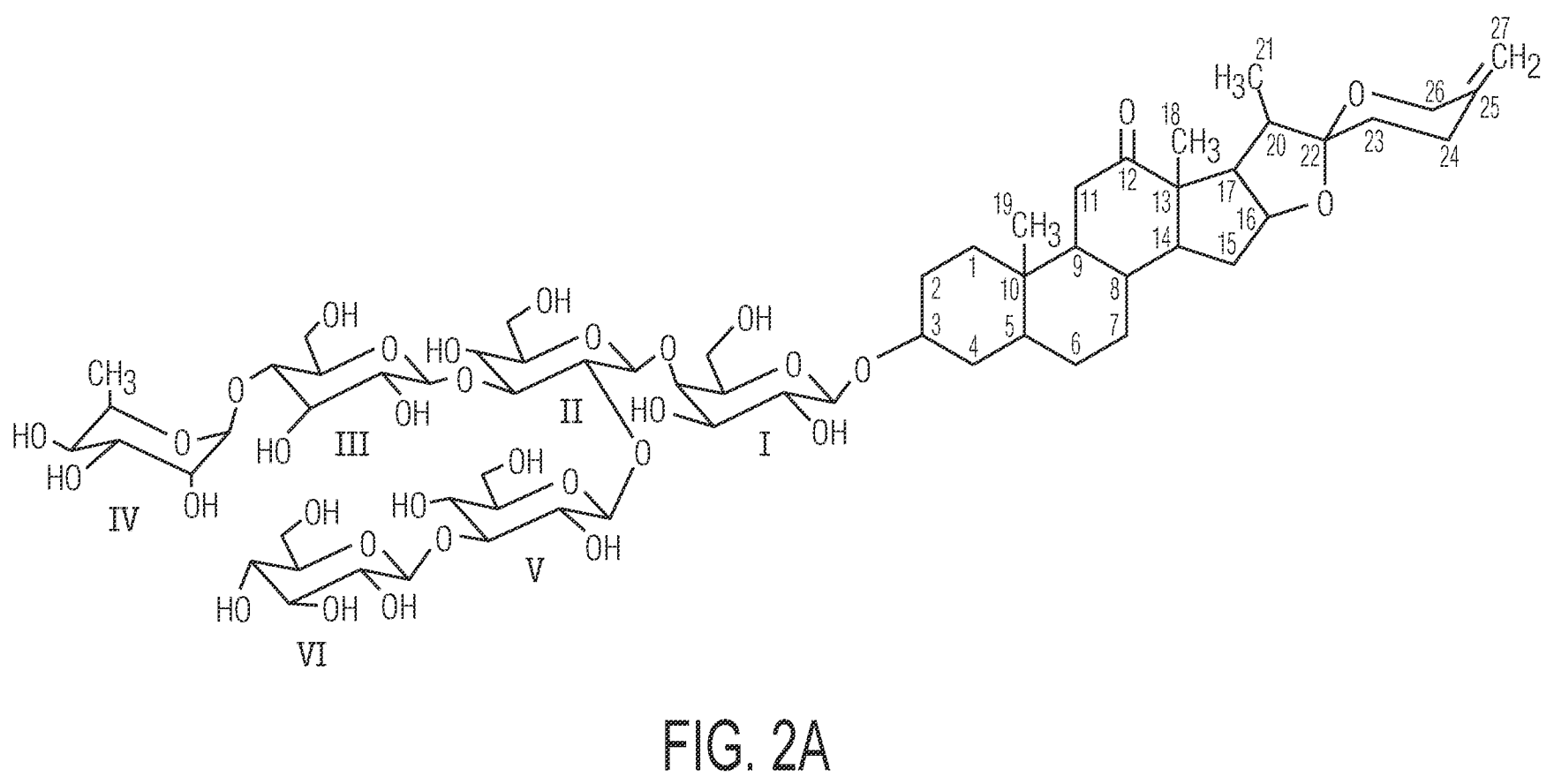

FIGS. 2A-C illustrate various novel saponins extracted from non-woody plants of the genus *Hesperaloe* according to the present invention including, 25(27)-dehydrofucreastatin (FIG. 2A), 5(6),25(27)-disdehydroyuccaloiside C (FIG. 2B), and 5(6)-disdehydroyuccaloiside C (FIG. 2C).

DEFINITIONS

Figure 2B:
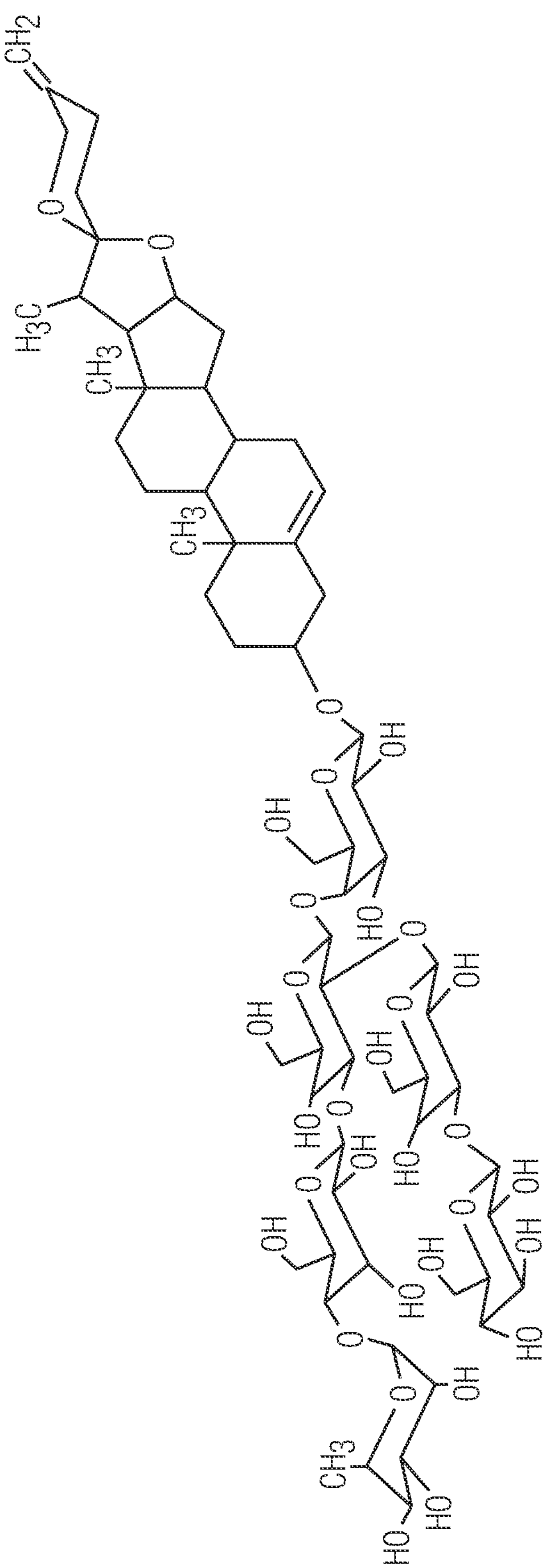

As used herein the term "biomass" generally refers to whole plants and plant organs (i.e., leaves, stems, flowers, roots, etc.) of the genus *Hesperaloe* including, for example, *Hesperaloe funifera, Hesperaloe nocturna, Hesperaloe parviflora*, and *Hesperaloe chiangii*. In particularly preferred instances water soluble solids may be prepared from biomass consisting essentially of the above ground portion of the *Hesperaloe* plant and more particularly the portion of the *Hesperaloe* plant above the crown and still more preferable the leaves of the *Hesperaloe* plant.

As used herein the term "bagasse" generally refers to biomass that has been subjected to an extraction process such as, for example, continuous solvent extraction or milling, so that the resulting solids have less water soluble solids than the biomass from which it is derived. In certain preferred embodiments bagasse is prepared by subjecting biomass to high pressure, such as by milling. High pressure may be achieved by using compression pressure, such as that provided by machines such one or more opposed counter-rotating rolls, a mechanical press, a screw press as well as by direct hydraulic pressure and other processes to apply pressure to the biomass and remove intercellular and intracellular liquid.

As used herein the term "milling" generally refers to the application of sufficient pressure to force the intercellular and intracellular liquid from the biomass.

As used herein, the term "saccharide" is used interchangeably with the terms "polysaccharide," "oligosaccharide" and "sugar" the definitions of which are well known to those skilled in the art of carbohydrate chemistry. It should be noted that the saccharides can be in the form of mono-, oligo- and/or polysaccharides. Preferably saccharides are water soluble and do not include cellulose, hemicellulose or mono-, oligo- and/or polysaccharides bound to other compounds, such as glycosides (arabinose, glucose, galactose, xylose, and glucuronic acid) bound to a triterpernoid to form a saponin.

Figures 1A, 1B:
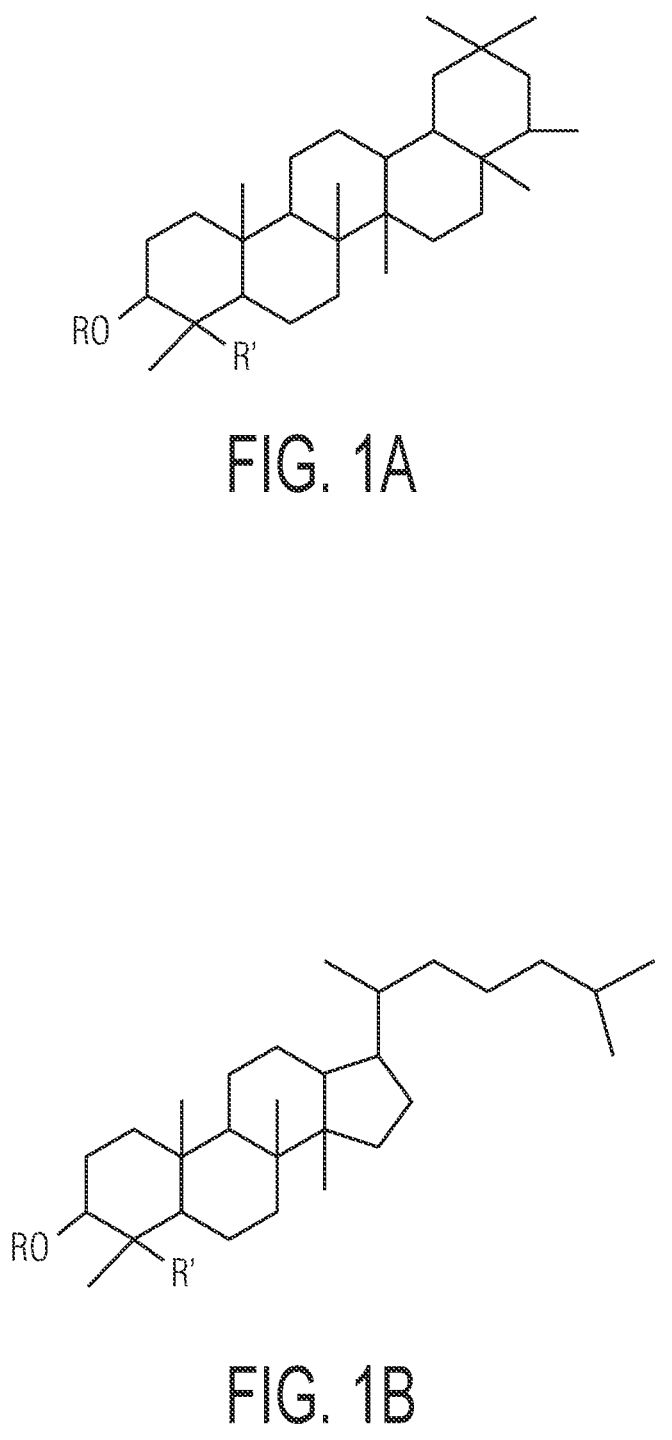

As used herein the term "saponin" generally refers to glycosides comprising a sugar component referred to as a glycone and a non-sugar component referred to as an aglycone. Depending on the structure of the aglycone the saponin may be classified as a triterpenoid saponin, illustrated in FIG. 1A, or to steroidal saponin, illustrated in FIG. 1B. The aglycone portion of the saponin may be either a pentacyclic triterpenoid or a tetracyclic triterpenoid, both of which contain 30 carbon atoms. Whether steroidal or triterpenoid, saponins may be mono, bi- or tridesmodic. Monodesmodic saponins have a single saccharide, normally attached at C-3. Bidesmodic saponins have two saccharides, often with one attached through an ether linkage at C-3 and the other either attached through an ester linkage at C-28 or through an ether linkage at C-20 (pentacyclic and tetracyclic triterpene saponins, respectively), or through an ether linkage at C-26 (furostane saponins). In certain instances, *Hesperaloe* biomass may comprises at least about 5 wt % of total saponins, such as from about 5 to about 15 wt %, such as from about 8 to about 12 wt %, based upon the bone dry weight of the biomass. Total saponins may be determined as described in the Test Methods section below.

As used herein the term "water soluble solids" generally refers to dry matter which remains after the extract has been centrifuged, filtered and all water is evaporated. The procedure for measuring water soluble solids of a biomass extract of the present invention is described in detail in the Test Methods section below. Water soluble solids may be expressed on a percentage basis relative to the mass of bone dry biomass.

As used herein the term "water insoluble solids" generally refer to the fraction of extract that is removed by centrifugation and filtration in the course of measuring water soluble solids, as described in the Test Methods section below.

As used herein the term "surfactant" generally refers to a substance or compound that reduces surface tension when dissolved in water or water solutions, or that reduces interfacial tension between two liquids, or between a liquid and a solid and includes cationic, anionic, nonionic, zwitterionic, amphoteric agents and/or combinations thereof.

As used herein the term "natural" means that at least 95% of the components of the product are derived from plant and mineral based materials.

DETAILED DESCRIPTION

This invention relates to surfactant compositions comprising saponins derived from non-woody plants and more particularly the non-woody plants of the genus *Hesperaloe*. In particular, the present invention is directed towards surfactant compositions, particularly natural surfactant compositions useful as adjuvants in agricultural formulations, comprising saponins derived from one or more of *Hesperaloe funifera, Hesperaloe nocturna, Hesperaloe parviflora*, and *Hesperaloe chiangii*. Saponins prepared from non-woody plants of the genus *Hesperaloe*, particularly *Hesperaloe funifera* may be combined with a surfactant selected from amphoteric surfactants, cationic surfactants, anionic surfactants, non-ionic surfactants to provide an aqueous surfactant composition having advantageous wetting properties such as a surface tension below 30 mN/m at 20° C., such as less than 29.5 mN/m, 29 mN/m, 28.5 mN/m, or 28 mN/m at 20° C.

In still other embodiments the invention provides agricultural compositions that may be applied to flora to deliver an active compound, such as a liquid or particulate pesticide, insecticide, acaricide, fungicide, nematocide, disinfectant, herbicide, fertilizer, or micronutrient. Typically, the active compound is delivered in an aqueous liquid system as a foliar spray. While in certain instances it may be desirable to treat plant foliage, all plants and plant parts can be treated.

In one embodiment, the agricultural composition comprises a saponin derived from *Hesperaloe* and a herbicide selected from selected from the group consisting of acetyl CoA carboxylase (ACCase) inhibitors, enolpyruvyl shikimate-3-phosphate synthase (EPSPS) inhibitors, glutamine synthetase inhibitors, auxins, photosystem I (PS I) inhibitors, photosystem II (PS II) inhibitors, acetolactate synthase (ALS) or acetohydroxy acid synthase (AHAS) inhibitors, mitosis inhibitors, protoporphyrinogen oxidase (PPO) inhibitors, cellulose inhibitors, oxidative phosphorylation uncouplers, dihydropteroate synthase inhibitors, fatty acid and lipid biosynthesis inhibitors, auxin transport inhibitors and carotenoid biosynthesis inhibitors, salts and esters thereof, racemic mixtures and resolved isomers thereof, and mixtures thereof.

In a particularly preferred embodiment, the agricultural composition comprises a saponin derived from *Hesperaloe* and a PSPS herbicides such as glyphosate or a salt or ester thereof.

In other embodiments the agricultural composition comprises a saponin derived from *Hesperaloe* and an auxin herbicide selected from the group consisting of 2,4-D, 2,4-DB, dichloroprop, MCPA, MCPB, aminopyralid, clopyralid, fluroxypyr, triclopyr, diclopyr, mecoprop, dicamba, picloram and quinclorac, salts and esters thereof, and mixtures thereof.

Where an herbicide is referenced generically herein by name, unless otherwise restricted, that herbicide includes all commercially available forms known in the art such as salts, esters, free acids, and free bases, as well as stereoisomers thereof. For example, where the herbicide name glyphosate is used, glyphosate acid, salts and esters are within the scope thereof.

In other embodiments agricultural compositions of the present invention may comprise a saponin derived from *Hesperaloe* and an insecticide, fungicide, herbicide, or pesticide selected from the group consisting of avermectin, ivermectin, milbemycin, imidacloprid, aldicarb, oxamyl, fenamiphos, fosthiazate, metam sodium, etridiazole, pentachloro-nitrobenzene (PCNB), flutolanil, metalaxyl, mefenoxam, fosetyl-al, silthiofam, fludioxonil, myclobutanil, azoxystrobin, chlorothalonil, propiconazole, tebuconazole, pyraclostrobin, trifloxysulfuron, glyphosate and halosulfuron.

In still other embodiments agricultural composition comprises a saponin derived from *Hesperaloe* and at least one plant nutrient selected from nitrogen, phosphorus, potassium, sulfur, calcium, magnesium, iron, copper, boron, manganese, zinc, and molybdenum.

The presence of a saponin derived from *Hesperaloe* and a surfactant may increase the ability of the agricultural composition to wet the surfaces of foliage. In another embodiment, the compositions of the present invention can increase the ability the composition to wet the surface and improve the effectiveness of an active agent contained therein. For example, the composition may include an insecticide and/or fungicide and may be applied to a plant, such as by spraying, to improve pest deterrence. In other instances, the inventive compositions may improve the ability wetting of seeds when the composition is applied thereto. For example, seeds can be coated with an insecticide and/or fungicide to protect them prior to germination.

Compositions comprising saponins derived from *Hesperaloe* not only bring about the enhancement of the spectrum of action with respect to the phytopathogenic fungi, microorganisms, viruses, or pests but achieve a synergistic effect when combined with a surfactant, particularly a natural surfactant, which extends the range of action active agent. In this manner the rates of application the active agent may be lowered while the action remains equally good. Also, the active containing composition still achieves a high degree of phytopathogen control even where the amount of the active agent may have become totally ineffective at such low application rates. This allows, on the one hand, a substantial broadening of the spectrum of phytopathogens that can be controlled and, on the other hand, increased safety in use.

Accordingly, saponins derived from *Hesperaloe* may be combined with one or more surfactants, particularly a natural surfactant, to synergistically improve one or more properties of the composition such as surface properties, wetting, solubilization, spreading, emulsification, foaming ability, gelling, and thickening. The surfactant may suitably be selected from anionic, cationic, non-ionic or amphoteric surfactants, and mixtures thereof. Thus, the surfactant may be amphoteric, cationic, anionic, or non-ionic, or may be a mixture of two or more such surfactants.

Surfactants useful in the compositions of the present invention include cationic surfactants, for example, benzalkonium salts and alkyl trimethyl ammonium salts. Alternatively, the surfactant may be anionic, for example, it may be selected from alkyl benzene sulphonates, olefin sulphonates, alkyl sulfates, paraffin sulphonates, alkyl phenol sulfates, fatty ester sulphonates, alkyl phenol ether sulfates, alkyl ethanolamide sulfates, and alpha sulphofatty acid salts. The surfactant might alternatively be non-ionic, for example, it may be selected from amine oxides, alkyl glucosides, alkyl polyglucosides, polyhydroxy fatty acid amides, alkoxylated fatty acid esters and sucrose esters. The surfactant might alternatively be an amphoteric surfactant, for example, it may be selected from alkyl amphoacetates, alkyl amphopropionates, alkyl iminopropionates, alkyl amphohydroxypropyl sulfonates, alkyl hydroxysultaines, alkyl amidopropyl hydroxysultaines, alkyldimethyl and alkylamidopropyl betaines.

In particularly preferred instances, compositions of the present invention comprise a saponin derived from *Hesperaloe* and a nonionic surfactant, particularly an alkyl polyglucosides (APG) and more particularly an APG derived from a plant source. The foregoing compositions are effective adjuvants in agricultural formulations due to their very low surface and interfacial tensions that enable the formation of very fine particles in spray and aerosol compositions, and excellent and fast wetting of plant to be treated.

Alkyl polyglucosides (APGs) are polymeric in nature and can contain one or more glucoside units. APGs are usually provided as a mixture of products that differ in terms of the extent of polymerization. Suitable APGs are disclosed in U.S. Pat. No. 4,565,647, the contents of which are incorporated herein in a manner consistent with the present disclosure. Suitable APGs may have a hydrophobic group containing from about 6 to about 30 carbon atoms, or from about 10 to about 16 carbon atoms and a polysaccharide hydrophilic group containing from about 1.3 to about 10, or from about 1.3 to about 3, or from about 1.3 to about 2.7 saccharide units. Typical hydrophobic groups include alkyl groups, either saturated or unsaturated, branched or unbranched containing from about 8 to about 18, or from about 10 to about 16, carbon atoms. Suitable alkyl polysaccharides are octyl, nonyl, decyl, undecyl, dodecyl, tridecyl, tetradecyl, pentadecyl, hexadecyl, heptadecyl, and octadecyl, di-, tri-, tetra-, penta-, and hexaglucosides, galactosides, lactosides, glucoses, fructosides, fructoses and/or galactoses. Suitable mixtures include coconut alkyl, di-, tri-, tetra-, and pentaglucosides and tallow alkyl tetra-, penta-, and hexaglucosides.

Alkyl polyglucosides and derivatives useful in the present invention may have a molecular weight from about 700 to about 20,000 Da, such as from about 1,000 to about 20,000 Da, or from about 1,000 to about 15,000 Da, or from about 1,000 to about 10,000 Da or from about 1,500 to about 8,000 Da, or from about 2,000 to about 7,000 Da. In one preferred embodiment the molecular weights of the alkyl polyglucoside or derivative thereof are of the order of about 2,000 to about 6,000 Da.

Figure 2C:
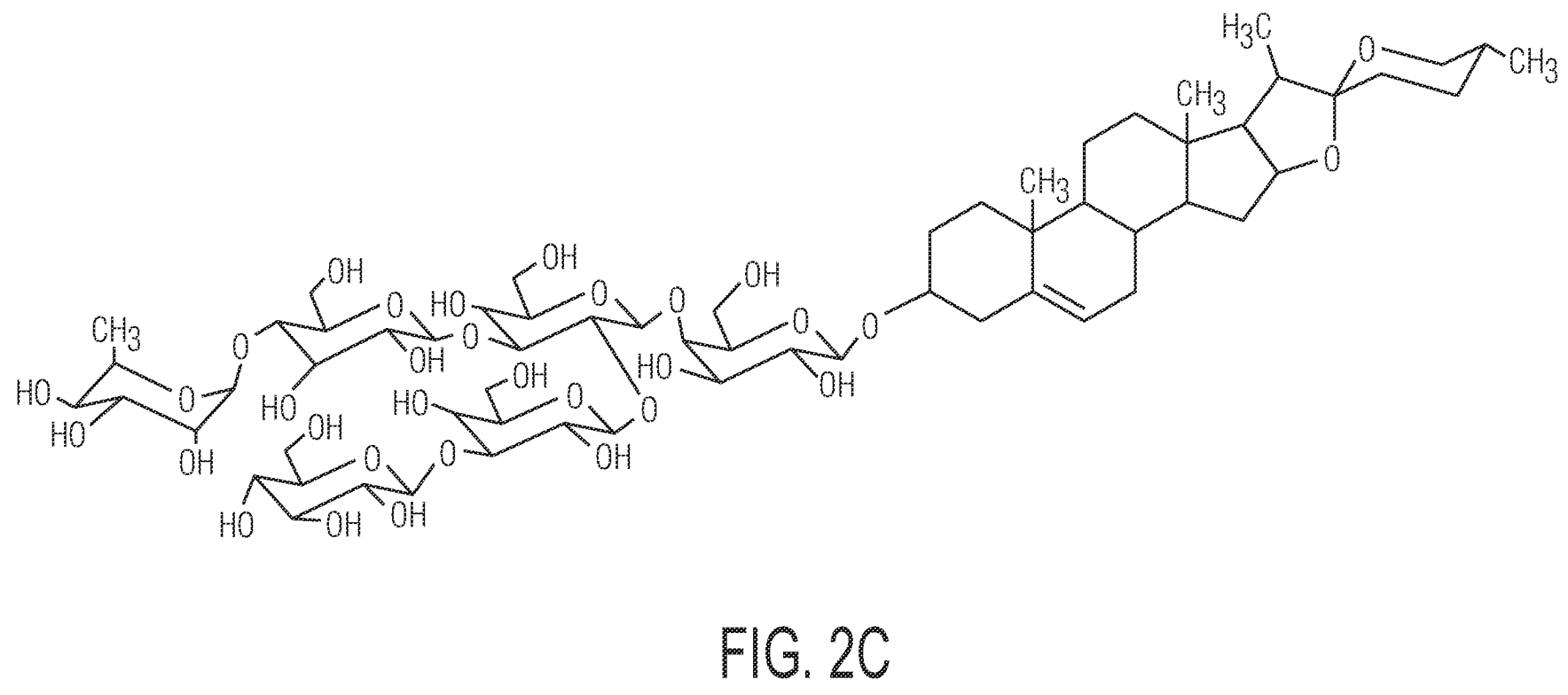

Preferred surfactant compositions comprise (A) one or more saponins extracted from a non-woody plant of the genus *Hesperaloe*, wherein the one or more saponins comprise 25(27)-dehydrofucreastatin (FIG. 2A), 5(6),25(27)-disdehydroyuccaloiside C (FIG. 2B), 5(6)-disdehydroyuccaloiside C (FIG. 2C), furcreastatin or yuccaloiside C and (B) a surfactant selected from anionic, cationic, non-ionic or amphoteric surfactants.

In still other embodiments surfactant compositions comprise (A) one or more saponins extracted from a non-woody plant of the genus *Hesperaloe*, wherein the one or more saponins comprise 25(27)-dehydrofucreastatin (FIG. 2A), 5(6),25(27)-disdehydroyuccaloiside C (FIG. 2B), 5(6)-disdehydroyuccaloiside C (FIG. 2C), furcreastatin or yuccaloiside C and (B) a nonionic surfactant. Particularly preferred nonionic surfactants include amine oxides, alkyl glucosides, alkyl polyglucosides, polyhydroxy fatty acid amides, alkoxylated fatty acid esters, sucrose esters, and mixtures thereof.

Particularly preferred surfactant compositions comprise (A) one or more saponins extracted from a non-woody plant of the genus *Hesperaloe*, wherein the one or more saponins comprise 25(27)-dehydrofucreastatin (FIG. 2A), 5(6),25(27)-disdehydroyuccaloiside C (FIG. 2B), 5(6)-disdehydroyuccaloiside C (FIG. 2C), furcreastatin or yuccaloiside C and (B) an alkyl polyglucoside or a derivatives thereof.

Other preferred surfactant compositions comprise (A) one or more saponins extracted from a non-woody plant of the genus *Hesperaloe*, wherein the one or more saponins comprise 25(27)-dehydrofucreastatin (FIG. 2A), 5(6),25(27)-disdehydroyuccaloiside C (FIG. 2B), 5(6)-disdehydroyuccaloiside C (FIG. 2C), furcreastatin or yuccaloiside C and (B) saponins derived from a plant source other than *Hesperaloe*. The non-*Hesperaloe* plant source may be selected from shikakai, soyabeans, beans, peas (*Pisum sativum*), lucerne, tea, spinach, sugar beet, quinoa, liquorice, sunflower, horse chestnut, ginseng, oats, capsicum peppers, aubergine, tomato seed, alliums, asparagus, yam, fenugreek, *yucca* and ginseng, lucerne, mung beans, *Bupleurum falcatum, Camellia oleifera, Camellia sinensis Desmodium adscendens, Gypsophila, Panax quinqufolius, Panax japonicas, Quillaja saponaria, Sapindus delavayi, Sapindus mukorossi, Sapindus marginatus, Sapindus saponaria, Sapindus trifoliatus, Saponaria officinalis, Styrax japonica* or any mixture thereof.

In certain embodiments it may be that the surfactant composition comprises from about 5 to about 90% by weight, e.g. from about 10 to about 80% by weight, or from about 15 to about 70% by weight, or from 20 to 60% by weight of (A) and from about 5 to about 90% by weight, e.g. from about 10 to about 80% by weight, or from about 15 to about 70% by weight, or from 20 to 60% by weight (B).

In other embodiments if the binary combination of (A) saponins derived from *Hesperaloe* and (B) a surfactant are present in certain weight ratios; the synergistic effect is particularly pronounced. However, the weight ratios of the active compounds in the active compound combinations can be varied within a relatively wide range. In general, in the combinations according to the invention the compounds (A) and (B) are present in a synergistically effective weight ratio of (A):(B) in a range of 125:1 to 1:125, preferably in a weight ratio of 50:1 to 1:50, most preferably in a weight ratio of 20:1 to 1:20. In addition, the weight ratio between any two compounds, independently of each other, is from 1500:1 to 1:1500, preferably from 1250:1 to 1:1250, more preferably, 1000:1 to 1:1000 and most preferably 750:1 to 1:750. Further ratios of (A):(B) which can be used according to the present invention with increasing preference in the order given are: 900:1 to 1:900, 800:1 to 1:800, 700:1 to 1:700, 600:1 to 1:600, 500:1 to 1:500, 400:1 to 1:400, 300:1 to 1:300, 250:1 to 1:250, 200:1 to 1:200, 100:1 to 1:100, 90:1 to 1:90, 80:1 to 1:80, 70:1 to 1:70, 60:1 to 1:60, 40:1 to 1:40, 30:1 to 1:30, 10:1 to 1:10, 5:1 to 1:5, 4:1 to 1:4, 3:1 to 1:3.

The surfactant composition is preferably a synergistic surfactant composition. Typically, a synergistic surfactant composition will show at least one, optionally more than one, improved property when compared to A and B when tested individually. Typically, the wetting effect of the synergistic surfactant composition will show at least one, optionally more than one, improved property when compared to the wetting effect of A and B when tested individually.

In use, the surfactant compositions of the present invention may be added to an aqueous liquid and reduces the surface tension of the aqueous liquid. Advantageously, the surfactant compositions enable an aqueous liquid containing the surfactant composition to achieve a surface tension below 30 mN/m at 20° C., such as less than 29.5 mN/m, 29 mN/m, 28.5 mN/m, or 28 mN/m at 20° C. The ability to achieve such low surface tensions with the surfactant composition of the invention is unexpected. A skilled person can determine the surface tension of an aqueous liquid containing the surfactant composition of the invention using known techniques. One exemplary technique is pendant drop goniometry, which allows surface and interfacial tensions to be determined from optical analysis of the geometry of a pendant drop.

Additionally, despite providing for relatively low degrees of surface tension, the surfactant compositions enable the reduction of the static or advancing aqueous contact angle of liquids comprising the composition, reflecting an improvement in wettability. In some embodiments the contact angle of the liquid comprising the surfactant composition is decreased on a low energy surface compared to the contact angle of the same liquid in the absence of the surfactant composition. In other embodiments, the advancing aqueous contact angle of the liquid can be decreased to less than about 90, 80, 70, 60, 50, 40, 30, 20, 10 or 5 degrees. In one embodiment the advancing contact angle of the aqueous liquid can be decreased to less than 10 degrees. The wettability of the surface can be measured by any means known to the person skilled in the art. The wettability can be determined by contact angle goniometry. Advantageously, the wettability is determined using sessile (or static) drop measurements.

Besides the actual synergistic wetting effect, the invention also have further surprising advantageous properties which can also be described, in a wider sense, as synergistic activity. Examples of such advantageous properties that may be mentioned are advantageous behavior during formulation or upon application, for example upon grinding, sieving, emulsifying, dissolving or dispensing; increased storage stability; improved stability to light; more advantageous degradability; improved toxicological or ecotoxicological behavior; improved characteristics of the useful plants including: emergence, crop yields, more developed root system, tillering increase, increase in plant height, bigger leaf blade, less dead basal leaves, stronger tillers, greener leaf color, less fertilizers needed, less seeds needed, more productive tillers, earlier flowering, early grain maturity, less plant verse (lodging), increased shoot growth, improved plant vigor, and early germination; or any other advantages familiar to a person skilled in the art.

In particularly preferred embodiments saponin containing compositions of the present invention are suitable for mobilizing the defense system of the plant against attack by unwanted phytopathogenic fungi, microorganisms, viruses, or pests. This may, if appropriate, be one of the reasons of the enhanced activity of the combinations according to the invention, for example against fungi. Plant-strengthening (resistance-inducing) substances are to be understood as meaning, in the present context, those substances or combinations of substances which are capable of stimulating the defense system of plants in such a way that, when subsequently inoculated with unwanted phytopathogenic fungi, microorganisms, viruses or pests, the treated plants display a substantial degree of resistance to these fungi, microorganisms, viruses or pests. Thus, the substances according to the invention can be employed for protecting plants against attack by the abovementioned pathogens within a certain period of time after the treatment. The period of time within which protection is effected generally extends from 1 to 10 days, preferably 1 to 7 days, after the treatment of the plants with the inventive saponin containing compositions.

In certain embodiments the invention provides a method for curatively or preventively controlling the phytopathogenic fungi, microorganisms, viruses or pests of plants or crops comprising the use of a formulation comprising a saponin derived from *Hesperaloe*, optionally a surfactant, particularly a naturally derived surfactant, and an active agent, such as a pesticide, insecticide, acaricide, fungicide, nematocide, disinfectant, herbicide, fertilizer or micronutrient by application to the seed, plant propagation material, the plant or to the fruit.

The treatment of plants and plant parts with compositions according to the invention is carried out directly or by action on their environment, habitat or storage area by means of the normal treatment methods, for example by watering (drenching), drip irrigation, spraying, vaporizing, atomizing, broadcasting, dusting, foaming, spreading-on, and as a powder for dry seed treatment, a solution for seed treatment, a water-soluble powder for seed treatment, a water-soluble powder for slurry treatment, or by encrusting, in the case of propagation material, in particular in the case of seeds, furthermore by dry treatments, slurry treatments, liquid treatments, by one- or multi-layer coating. It is furthermore possible to apply the active compounds by the ultra-low volume method, or to inject the active compound preparation or the active compound itself into the soil.

In particularly preferred embodiments compositions comprising saponins extracted from plants of the genus *Hesperaloe* accelerate the delivery of agrochemical through isolated cuticle membranes and can thus be used as foliar penetrants for the delivery of agrochemicals. Thus, the invention provides an agricultural composition for foliar application comprising an agrochemical and one or more saponins extracted from a plant of the genus *Hesperaloe*. The agrochemicals may include a pesticide, insecticide, acaricide, fungicide, nematocide, disinfectant, herbicide, fertilizer, or micronutrient. In one preferred embodiment, the at least one saponin is 25(27)-dehydrofucreastatin (FIG. 2A), 5(6),25(27)-disdehydroyuccaloiside C (FIG. 2B), 5(6)-disdehydroyuccaloiside C (FIG. 2C), furcreastatin or yuccaloiside C and the pesticide is an herbicide, preferably 2,4-D.

The method of treatment according to the invention also provides the use a saponin derived from *Hesperaloe* and an active agent, such as an agrochemical, and optionally a non-ionic surfactant in a simultaneous, separate, or sequential manner.

The dose of active compound/application rate usually applied in the method of treatment according to the invention is generally and advantageously for foliar treatments: from 0.1 to 10,000 g/ha, preferably from 10 to 1,000 g/ha, more preferably from 25 to 300 g/ha; in case of drench or drip application, the dose can even be reduced, especially while using inert substrates like rockwool or perlite; for seed treatment: from 2 to 200 g per 100 kilogram of seed, preferably from 3 to 150 g per 100 kilogram of seed; for soil treatment: from 0.1 to 10,000 g/ha, preferably from 1 to 5,000 g/ha.

The doses herein indicated are given as illustrative examples of the method according to the invention. A person skilled in the art will know how to adapt the application doses, notably according to the nature of the plant or crop to be treated.

The composition according to the invention can be used in order to protect plants within a certain time range after the treatment against phytopathogenic fungi, microorganisms, viruses, or pests. The time range, in which protection is effected, spans in general one to 28 days, preferably one to 14 days after the treatment of the plants with the combinations or up to 200 days after the treatment of plant propagation material.

The method of treatment according to the invention may also be useful to treat propagation material such as tubers or rhizomes, but also seeds, seedlings or seedlings pricking out and plants or plants pricking out. This method of treatment can also be useful to treat roots. The method of treatment according to the invention can also be useful to treat the over-ground parts of the plant such as trunks, stems or stalks, leaves, flowers, and fruit of the concerned plant.

Saponins useful in the present invention may be prepared by extracting *Hesperaloe* biomass, particularly the leaves and more particularly the leaves above the crown of the plant, with at least one solvent selected from the group consisting of water, methanol, ethanol, butanol, and isopropanol and mixtures thereof. For example, in one embodiment, the process comprises contacting biomass with an extractant solution comprising water and separating the water soluble fraction from the insoluble biomass fraction. In other embodiments the extractant solution may comprise, in addition to water, a surfactant, a solvent and optionally extract-bearing juice. The extract-bearing juice can come from, for example, an earlier extraction step or an earlier milling step.

Milling operations useful for separating the bagasse and water soluble solids may include a roll, screw, and other forms of presses. The solvent may be introduced during the milling process to extract hydrophilic solids from the bagasse. In certain instances, the bagasse can then be contacted with the juice in a subsequent milling step, often referred to as imbibing. In certain instances, the biomass may be cut to size and cleaned prior to milling.

A simple water extraction of *Hesperaloe* biomass may yield a crude aqueous extract comprising saccharides, polysaccharides, inorganic salts, saponins and sapogenins. A crude extract may also be produced using methanol as a solvent, or a mixture of methanol and water, to extract biomass, which may have been previously extracted with acetone or diethyl ether to remove lipids and pigments. In other instances, the biomass may be extracted with a 4:1 ethanol-water solvent, followed by subsequent defatting of the extract with a non-polar solvent such as hexane. In certain instances, the defatted extract may be subjected to further treatment to isolate specific water soluble components, such as saponins, which may be purified from the defatted extract by mixing with butanol and separating the butanol phase to yield a mixture of saponins that are substantially free from proteins and free saccharides and polysaccharides.

Hot aqueous extractants can also be used. For example, in one embodiment water soluble solids may be extracted from *Hesperaloe* biomass, particularly the leaves, by extracting the biomass with hot aqueous ethanol or isopropanol (75 to 95% by weight alcohol). The aqueous alcohol extraction fluid may then be filtered and concentrated, and the fat-soluble material may be removed by mixing the extraction fluid with a non-polar solvent such as hexane. A substantially pure saponin composition may then be prepared by further extracting defatted extract with a polar solvent such as butanol.

For the purpose of preparing the compositions of the present invention, and for use in the present method, a simple aqueous extract may be preferred, although other extraction methods are within the scope of the present invention. In a particularly preferred embodiment, *Hesperaloe* biomass may be cut to size, pressed, and extracted with an aqueous solvent to remove water soluble extracts such as inorganic salts, saccharides, polysaccharides, organic acids and saponins. The water soluble extracts are collected and may be concentrated by techniques well known in the art such as, for example, evaporation, spray-drying, drum drying and the like. The extract may be concentrated until it has a solids content of about 20 to about 100% solids by weight, such as from about 20 to about 95% solids by weight, such as from about 20 to about 80% solids by weight.

In certain embodiments water soluble extracts may be concentrated by feeding the extract solution to atomizing equipment. Suitable atomizing equipment includes, but is not limited to, a rotary wheel atomizer, a pressure nozzle atomizer, and a dual fluid nozzle atomizer. Rotary wheel, pressure nozzle and dual fluid nozzle atomizers are known to those of ordinary skill in the art and include those in spray dryers commercially available from a variety of sources, such as GEA Process Engineering.

In other embodiments the water soluble solids may be recovered from biomass by diffusion. In diffusion, the biomass brought into contact with the liquid to extract the liquid components. Usually, the biomass is prepared by first cutting, but not shearing or crushing so as to minimize the damage to fibers and avoid the creation of an excessive amount of fines. The prepared biomass is then washed repeatedly, usually using a solvent, to extract the liquid contained in the biomass. The solvent can be any of the foregoing solvents. An exemplary treatment solvent is water, particularly hot water such as water heated to a temperature from about 40 to about 90° C. The solvent can be circulated and reused so that the solvent used for a first extraction is reused as a solvent to extract subsequent prepared biomass.

Various types of diffusers are known in the art and can be adapted for use with biomass as described herein. Suitable diffusers include a ring diffuser, a tower diffuser, or a drum diffuser. Exemplary diffusion systems are discussed, for example, in U.S. Pat. Nos. 4,182,632, 4,751,060, 5,885,539 and 6,193,805 the contents of which are hereby incorporated in a manner consistent with the present disclosure. Numerous other diffusion methods and devices for the diffusion method are known and can be adapted for use in the methods described herein. One such diffuser is the continuous-loop, counter-current, shallow-bed Crown Model Ill Percolation Extractor, commercially available from Crown Iron Works, Blaine, MN.

The biomass, cut or uncut, may be extracted by any suitable extraction process as discussed above. In a particularly preferred embodiment, the solvent used for extraction comprises water. One of skill in the art will recognize the ratio of extraction solvent to biomass will vary based on the solvent, the amount of biomass to be extracted and the extraction procedure. In certain preferred embodiments, the extraction solvent is water and the ratio of extraction solvent to biomass, on the basis of liters of extraction solvent to kilogram of bone-dry biomass, is from about 1:5 to about 1:100, such as from about 1:5 to about 1:50 and more preferably from about 1:5 to about 1:20.

The pH of the extraction solvent can be between about pH 5.0 and 8.0, such as, for example, between about pH 6.0 and about pH 8.0, between about pH 6.5 and about pH 7.5. In a particular embodiment, the extraction solvent is water having a pH between about pH 6.5 and about pH 7.5. In those embodiments where extraction includes imbibition with a crude juice, the imbibition fluid may have a pH from about 4.0 to about 5.0.

The extraction may be carried out at temperatures between about 25 and about 90° C., such as, for example, between about 30 and about 80° C., between about 35 and about 75° C., between about 40 and about 70° C., between about 45 and about 65° C. or between about 50 and about 60° C.

In embodiments where the extraction process is a batch extraction process, the duration of extraction may range from about 0.25 to about 24 hours, such as, for example, from about 0.5 to about 2 hours, from about 1 to about 8 hours, or from about 1 to about 6 hours.

In embodiments where the extraction process is a continuous process, the duration of extraction may range from about 0.25 to about 5 hours, such as, for example, from about 0.5 to about 3 hours.

After extraction the water insoluble biomass material may be separated from the water soluble solids by filtration to provide a filtrate containing inorganic salts, saccharides, polysaccharides, organic acids and saponins (referred to herein as the "first filtrate"). Separation can be achieved by any suitable means including, but not limited to, gravity filtration, a plate-and-frame filter press, cross flow filters, screen filters, Nutsche filters, belt filters, ceramic filters, membrane filters, microfilters, nanofilters, ultrafilters or centrifugation. Optionally various filtration aids such as diatomaceous earth, bentonite, zeolite, etc., may also be used in this process.

After separation, the pH of the first filtrate may be adjusted to remove additional impurities. In one embodiment, the pH of the first filtrate can be adjusted to between about 8.5 and about 10.0 by treatment with a base, such as, for example, calcium oxide or hydroxide (about 1.0% from the volume of filtrate) with slow agitation.

In a particularly preferred embodiment processing biomass according to the present invention removes at least about 25% of the water soluble solids from the biomass, more preferably at least about 50%, still more preferably at least about 75%, such as from about 25 to about 98%, such as from about 50 to about 90%, such as from about 75 to about 90%.

The amount of water soluble solids recovered from biomass may vary depending on the extraction efficiency, however, in certain instances from about 95 to about 350 grams of water soluble solids may be extracted per kilogram of bone dry biomass, such as from about 120 to about 315 grams per kilogram, such as from about 150 to about 300 grams per kilogram. Of the extracted water soluble solids, the total saponins may comprise from about 10 to about 30 wt %, based upon the bone dry weight of the water soluble solids. In this manner the amount of total saponins that may be extracted from biomass may range from about 10 to about 100 grams per bone dry kilogram of biomass, such as from about 20 to about 80 grams, such as from about 25 to about 75 grams. In certain instances, the amounts of materials (on bone dry grams per kilogram of bone dry biomass) removed from the biomass during the extraction process may range as set forth in Table 1, below.

TABLE 1

| | Amount (g/kg of bone dry biomass) |
|---|---|
| Total Extracted Solids | 100-400 |
| Total Water Insoluble Solids | 5-50 |
| Total Water Soluble Solids | 95-350 |
| Total Saponins | 10-100 |

In a particularly preferred embodiment milling of the biomass is carried out with the addition of an aqueous solvent, such as water, having a pH ranging from about 5 to about 9, such as from about 6 to about 7 to about 8. The water soluble solids are generally recovered from the milling process as a crude extract and may be subjected to further processing to recover specific compounds, such as saccharides, polysaccharides, organic acids and saponins.

The suspended solids, also referred to herein as the water insoluble fraction, may be removed from the crude extract by well-known processes including, for example, clarification, filtration, centrifugation, or a combination thereof. The amount of water insoluble solids in the extract (on bone dry grams per kilogram of bone dry biomass) may range from about 1.0 to about 30 grams and may comprise hydrophobic substances such as waxes and the like.

After removal of suspended solids, the clarified juice may be used directly, concentrated, or subjected to further processing to isolate one or more water soluble solids such as saccharides, polysaccharides, organic acids, saponins and sapogenins. In other instances, the clarified juice may be further purified to remove saccharides, polysaccharides, and organic acids to yield composition comprising saponins.

In particular instances saponins may be extracted and recovered from non-woody plants of the genus *Hesperaloe* according to the present invention. As used here, the term saponin generally refers to a compound consisting of a triterpenoid of oleanane structure and one or more glycosides, the glycosides being bound to the triterpenoid at the 3 position and/or at the 28 position. The term glycoside is intended to mean all sugars including glucose found naturally in non-woody plants of the genus *Hesperaloe* including arabinose, glucose, galactose, xylose, and glucuronic acid.

Saponins may obtained by sequentially extracting the biomass from non-woody plants of the genus *Hesperaloe* with water and then further treating the water soluble fraction with a water-immiscible polar solvent to form a polar solvent-saponin mixture. Suitable water-immiscible polar solvents include, for example, alcohols having from 4 to 6 carbon atoms, such as butyl, amyl, hexyl and cyclohexyl alcohols. The polar solvent may be removed from the saponin-containing mixture to produce a saponin-containing product.

The juice resulting from the foregoing extraction process may be subjected to further extraction to obtain saponin in the form of a crude saponin extract or its substantially purified form comprising saponins at a concentration from about 30 to about 90% in weight. The extraction method may comprise mixing juice extracted from non-woody plants of the genus *Hesperaloe* with a water-immiscible polar solvent. Suitable water-immiscible polar solvents include, for example, alcohols having from 4 to 6 carbon atoms, such as butyl, amyl, hexyl and cyclohexyl alcohols. Extraction of the juice with a water-immiscible polar solvent generally removes impurities such as proteins, carbohydrates, and organic acids, which remain in the aqueous phase, the saponin being transferred to the solvent phase.

The solvent phase containing the saponin may be subjected to further treatment to separate the saponin from the alcohol phase. This can be accomplished in various ways including, for example, by cooling, by dehydrating the solvent extract, or by adding an organic solvent which is miscible with the alcohol solvent but in which the saponin is insoluble. Suitable precipitating solvents include, for example, diethyl ether, petroleum ether, acetone, and chloroform.

In a particularly preferred embodiments, the saponin is separated from the alcohol by flash evaporation. Flash evaporation is a technique known in preparative chemistry for the rapid removal of a volatile component from a liquid mixture. The volatile liquid is removed from solution by rapid conversion to a vapor phase by creating a thin film of the solution over a large surface area under reduced pressure often accompanied by an increase of temperature of the solution above ambient but less than the boiling point of the solution at atmospheric pressure. The actual thickness of the film and the area over which it is applied is chosen to provide optimum evaporation and ease of use, but evaporation may be substantially instantaneous (hence the name "flash" evaporation). Flash evaporation avoids the prolonged use of high temperatures that may degrade the intended product and has the ability to remove almost all of the alcohol component (which makes the remaining solution suitable for the preferred practice of spray drying employed in the next step. The alcohol may be recovered from this step and reused in the extraction process.

The saponin content of the alcohol extract can be further increased by passage over an ultrafiltration membrane without significant alteration to or loss of the saponin composition. This concentrated saponin fraction where the saponin content is in the range of 85-90%, can then be further purified in a liquid state or reduced to a dry state. Individual saponins may be recovered by a combination of reversed-phase solid phase extraction and preparative reversed-phase HPLC. Alternatively, the alcohol extract containing saponins can be fractionated directly by a combination of reversed-phase solid phase extraction and preparative reversed-phase HPLC.

In still other embodiments saponins may be purified from juice prepared according to the present invention comprising the steps of mixing the juice with a salt and a solvent to form a first solution. The solvent may comprise one or more solvents selected from acetic acid, acetone, acetonitrile, benzene, 1-butanol, 2-butanol, 2-butanone, t-butyl alcohol, carbon tetrachloride, chlorobenzene, chloroform, cyclohexane, 1,2-dichloroethane, diethylene glycol, diethyl ether, diglyme, 1,2-dimethoxyethane, dimethylformamide, dimethylsulfoxide, 1,4-dioxane, ethanol, ethyl acetate, ethylene glycol, glycerin, heptane, hexamethylphosphoramide, hexamethylphosphorous triamide, hexane, methanol, methyl-t-butyl ether, methylene chloride, N-methyl-2-pyrrolidinone, pentane, perchloroethylene, petroleum ether, 1-propanol, 2-propanol, pyridine, tetrahydrofuran, toluene, triethylamine, trifluorotoluene, water, xylene, or any combination of the forgoing. In some embodiments the solvent is water. The salt may be selected from an alkali metal salt, an alkaline earth salt, a transition metal salt, an ammonium salt, or combinations of the forgoing. In certain preferred embodiment the salt added to the plant extract to form the solution is an alkaline earth metal salt. In particularly preferred embodiments the salt is calcium chloride ($CaCl_2$), magnesium chloride ($MgCl_2$), or a mixture thereof.

The pH of the first solution is generally adjusted to a pH from about 6.0 to about 9.0, such as from about 6.0 to about 8.0, such as from about 6.0 to about 7.0. At least one phosphate may then be added to the first solution to form an ion-polysaccharides complex precipitate. Useful phosphates include, for example, sodium hydrogen phosphate ($Na_2HPO_4$), sodium dihydrogen phosphate ($NaH_2PO_4$), sodium phosphate ($Na_3PO_4$), or sodium hydrogen bisphosphate ($Na_2H_2PO_7$).

The precipitated ion-polysaccharides complex may be removed by filtration to yield a second solution, which may be further clarified to produce an extract of purified saponins. Optionally, the extract can be concentrated by any filtration technique known in the prior art. Preferably, the concentration of the extract of purified saponins is carried out by nanofiltration, ultrafiltration and diafiltration, or any combination of these techniques. In some embodiments, the saponin extract is substantially free of proteins. In some embodiments, the saponin extract is substantially free of polysaccharides. In some embodiments, the saponin extract is substantially free of phenolic compounds.

In other instances, the crude or partially purified saponin may be acidified to produce sapogenins. First a solution of saponins in an alcohol is prepared as described herein and then a strong acid, preferably 1-3.5 N, is added to the solution to hydrolyze the saponins to form corresponding sapogenins. The sapogenins may be further processed by precipitation, recovering the precipitate, and decolorizing the precipitate by forming a slurry of the precipitate with a solution of an aqueous base to form a decolorized sapogenin product.

In a particularly preferred embodiment sapogenins can be obtained by acid hydrolysis of a solution of saponins in an alcohol, for example using 450 mL concentrated HCl per 3 L of the alcohol extract under reflux. The hydrolysate is allowed to cool resulting in the formation of a precipitate which is recovered by filtration. The precipitate is slurried in water and the resulting slurry is adjusted preferably to pH 10 with a base. The sapogenins precipitate from the basic solution as off-white crystals and are recovered by filtration. The resulting crystalline precipitate may be washed with dilute acid and distilled water until the effluent is clear. The precipitate containing the sapogenins may then be air-dried and can be further refined by recrystallization.

The individual sapogenins may be recovered from this mixture, e.g. by preparative HPLC using reversed-phase adsorbents. The purification can also be achieved on a large scale by selective desorption from a reversed-phase solid-phase extraction cartridge eluted with a step gradient of aqueous methanol. Preparative HPLC and systems such as simulated moving bed chromatography are frequently in commercial use for recovery of high value solutes from solutions. The sapogenins may be further purified by recrystallization from hot 95% alcohol.

The saponin content of the various fractions during extraction may be monitored, for example, by HPLC analysis of a filtered 50% (v/v) ethanol or methanol extraction by chromatography on C-8 or C-18 RP columns eluted with a 0.05% Trifluoroacetic acid (v/v) (TFA) in water:methanol gradient, or a 0.05% TFA in water:acetonitrile gradient. Saponins in the samples may be detected by Evaporative Light Scattering Detection (ELSD) using, for example, Model PL-EMD 960 from Polymer Laboratories. Acetic acid (1%) can be used in place of TFA and chromatographic separation can be achieved by isocratic elution. The sapogenin content of extracts and samples derived by hydrolysis can also be determined using the same chromatographic procedure.

The total saponin content in *Hesperaloe*, on the basis of grams of total saponin per kilogram of bone dry biomass, may range from about 5.0 to about 150 g/kg, such as from about 50 to about 120 g/kg, such as from about 80 to about 120 g/kg. In other instances, water soluble solids prepared from *Hesperaloe* biomass according to the present invention may comprise at least about 5 wt % of total saponins, such as from about 5 to about 15 wt %, such as from about 8 to about 12 wt %, based upon the dry weight of the water soluble solids. The saponins may be provided as part of a crude juice, as part of a dried water soluble solids compositions, as a partially purified compositions or as a substantially pure composition comprising a mixture of saponins.

In certain embodiments saponins extracted from *Hesperaloe* biomass may have at least one of the following aglycones or genins: kammogenin, manogenin, gentrogenin, hecogenin, tigogenin, sarsapogenin, chlorogenin and gitogenin or their corresponding isomer or oxidized or reduced forms with at least one of the following glycosidic moieties (in the form of acid or salt): glucose, xylose, rhamnose, arabinose, or galactose. In other embodiments the saponins may comprise agamenoside, agaveside, agavoside, magueyside, agavasaponi, cantalasaponin, sisalsaponin, gabrittonoside, dongnoside or amolonin, or other steroidal saponins. In certain instances, the saponins may comprise 25(27)-dehydrofucreastatin (FIG. 2A), 5(6),25(27)-disdehydroyuccaloiside C (FIG. 2B), 5(6)-disdehydroyuccaloiside C (FIG. 2C), furcreastatin and yuccaloiside C.

The surfactant compositions of the present invention are suitable for mobilizing the defense system of the plant against attack by unwanted phytopathogenic fungi, microorganisms, viruses or pests and may be applied or administered by any one of a number of well-known methods and may vary depending on the locus of the attack or potential attack. For agronomic applications, saponin compositions of the present invention may be applied to surfaces of plant foliage, flowers, seeds, fruits and vegetables, roots, tubers, and even the soil in the vicinity of seeds, plants, and the like.

In certain embodiments the surfactant compositions may be delivered in a suitable solid or liquid carrier or vehicle that is compatible with the plant being treated. For example, composition of the present invention may be formulated as an aqueous spray or dip, wettable powder, drench, dust, granule, pellet, or the like, when applying the compositions to plants. These formulations are prepared in a known manner by mixing the saponin composition and an active agent with customary additives, such as, for example, customary extenders and also solvents or diluents, emulsifiers, dispersants, and/or bonding or fixing agent, wetting agents, water repellents, if appropriate UV stabilizers, colorants, pigments, defoamers, preservatives, secondary thickeners, adhesives, gibberellins and water as well further processing auxiliaries.

These compositions include not only compositions which are ready to be applied to the plant or seed to be treated by means of a suitable device, such as a spraying or dusting device, but also concentrated commercial compositions which must be diluted before application to the crop. The amount of saponin in a given surfactant composition of the present invention may range from about 0.01 to 50 wt % based on the total surfactant composition, such as from about 0.5 to about 20 wt %, such as from about 1.0 to about 10 wt %.

EXAMPLE

The inventive extract was prepared by forage harvesting mature *Hesperaloe funifera* leaves above the crown, cutting the leaves into pieces ranging from about 0.50 to about 8.0 cm and pressing the cut biomass using a sugar cane tandem press, each mill of the tandem press having 3 rollers. The biomass was pressed three times and the crude juice was collected and passed through 25 mm filter followed by microfiltration/nanofiltration to concentrate the extract to 15% solids. The water soluble solids comprised 20 wt % total saponins, based upon the bone dry weight of water soluble solids. The desired concentrations of saponins were achieved by diluting the concentrated water soluble solids with water.

For comparison a composition containing saponins extracted from *Yucca* was prepared. The *Yucca* extract, derived from *Yucca Schidigera* (commercially available from GS Plant Foods, Sanford Florida) and were provided as 60 wt % total saponins. *Yucca* extract was diluted with water to provide a composition having the desired weight percentage of total saponins.

For further comparison additional surfactant compositions were prepared from the commercially available non-ionic surfactant marked under the tradename Alligare 90 (commercially available from Alligare, Opelika, AL). The surfactant composition was diluted with distilled water to provide a composition having the weight percentage of surfactant indicated in Table 2, below.

To form the compositions of the Examples described below, an initial mixture is formed by combining a desired amount of surfactant with a desired amount of water. The components are then mixed to provide the surfactant composition.

Using the above general protocol, a range of different surfactant compositions containing range of different types and quantities of components were prepared, as detailed in Table 1. The prepared surfactant composition samples were diluted with ultra-pure water to form aqueous compositions having the surfactant composition at concentrations of 0.3 and 3.0 wt %. The surface tension of the prepared samples was then assessed by Wilhelmy Plate Method using a Kruss Tensiometer K100 (Kruss USA, Charlotte, N.C).

TABLE 2

| Example No. | Surfactant | Polar Component | Surface Tension (mN/M) 0.3% | Surface Tension (mN/M) 3.0% |
|---|---|---|---|---|
| 1 | APG | Water | 31.0 | 30.2 |
| 2 | *Hesperaloe* Extract | Water | 39.8 | 33.8 |
| 3 | Alligare 90 | Water | 43.1 | 32.9 |
| 4 | *Yucca* Extract | Water | 44.2 | 40.1 |

TABLE 3

| Example No. | First Surfactant (wt %) | Second Surfactant (wt %) | Polar Component | Surface Tension (mN/M) |
|---|---|---|---|---|
| 5 | *Hesperaloe* Extract (0.3%) | APG (0.3%) | Water | 28.7 |
| 6 | *Hesperaloe* Extract (0.3%) | APG (2.7%) | Water | 27.6 |
| 7 | *Hesperaloe* Extract (2.7%) | APG (0.3%) | Water | 30.2 |
| 8 | *Yucca* Extract (0.3%) | APG (0.3%) | Water | 29.9 |

Table 2 shows of the results of surface tension from pendant droplet goniometry as well as the concentration effect. Table 3 shows of the results of surface tension from pendant droplet goniometry of various inventive surfactant compositions and reference compositions tested at different concentrations.

Polar and dispersive components of the surfactant solutions were determined by measuring the surface tension of the solutions, and the contact angle on a clean poly(tetrafluoroethylene) plate. The surface tension of each solution was measured five times as described above using the Wilhelmy Plate Method using a Kruss Tensiometer K100 (Kruss USA, Charlotte, NC). The average, $\sigma L$, was recorded. The plate used was a standard platinum plate of 19.9 mm×0.2 mm perimeter. The contact angle for each solution was measured on a clean piece of poly(tertafluoroethylene) PTFE and was measured five times using a Kruss Drop Shape Analysis System, Model DSA10-Mk2 (Kruss USA, Charlotte, N.C.) and the average angle, $\theta$ PTFE, recorded. Dispersive and polar components were then calculated using the Fowlkes theory equation:

$$\sigma LD = [\sigma L2(\cos \theta PTFE + 1)2]/72$$

The polar surface tension component for the liquid, $\sigma LP$, is then calculated as the difference $\sigma L - \sigma LD$.

The polar component, ($\sigma_S^P$) and dispersive component, ($\sigma_S^D$), of each of the leaf surfaces (Cabbage, Corn and Dandelion) were determined by measuring the contact angle of diiodomethane and water on each of the leaf surfaces and applying the primary Fowlkes theory equation:

$$(\sigma_L^D)^{1/2}(\sigma_S^D)^{1/2} + (\sigma_L^P)^{1/2}(\sigma_S^P)^{1/2} = \sigma_L(\cos\theta + 1)/2$$

where $\sigma_L$ is the surface tension of the liquid and $\theta$ is the contact angle that the liquid makes with the surface. Contact angles were measured 5 times and the average recorded.

Diiodomethane is a liquid with a relatively high surface tension of 50.8 mN/m. Because of its molecular symmetry, diiodomethane only has a dispersive component such that $\sigma_L^P=0$ and $\sigma_L=\sigma_L^D=50.8$ mN/m. In the case of diiodomethane where $\sigma_L^P=0$ and $\sigma_L=\sigma_L^D$ the equation reduces to $\sigma_S^D=\sigma_L(\cos\theta+1)^2/4$ and the dispersive component of the solid surface can be determined.

The polar component of the surface free energy, $\sigma_S^P$, was then calculated by measuring the contact angle with distilled water which has a surface tension of 72.8 mN/m, a polar component value of 46.4 mN/m and a dispersive component value of 26.4 mN/m and inputting into the primary Fowlkes equation.

TABLE 4

| | Surface Tension ('$Y_s$, mN/m) | Polar Component ('$Y_s^P$, mN/m) | Dispersive Component ('$Y_s^D$, mN/m) | Surface Polarity (%) | Polar Component Ratio ('$Y_s^P$/'$Y_s$) |
|---|---|---|---|---|---|
| Cabbage Leaf | 24.8 | 1.28 | 23.49 | 5.18 | 0.052 |
| Corn Leaf | 27.8 | 2.88 | 24.59 | 10.48 | 0.105 |
| Dandelion Leaf | 31.4 | 5.09 | 26.27 | 16.23 | 0.162 |

TABLE 5

| Example No. | Surfactant (wt %) | Surface Tension ('$Y_s$, mN/m) | Polar Component ('$Y_s^P$, mN/m) | Dispersive Component ('$Y_s^D$, mN/m) | Surface Polarity (%) | Polar Component Ratio ('$Y_s^P$/'$Y_s$) |
|---|---|---|---|---|---|---|
| 1 | 3% | 30.2 | 11.66 | 18.57 | 38.57 | 0.39 |
| 2 | 3% | 33.8 | 3.42 | 30.35 | 10.12 | 0.10 |
| 5 | 0.6% | 28.7 | 8.09 | 20.62 | 28.18 | 0.28 |
| 8 | 0.6% | 29.9 | 10.49 | 19.41 | 35.07 | 0.35 |

TABLE 6

| | | Time to 50% Absorption (s.) | | | Time to 10° Contact Angle (s.) | | |
|---|---|---|---|---|---|---|---|
| Example No. | Surfactant (wt %) | Cabbage Leaf | Corn Leaf | Dandelion Leaf | Cabbage Leaf | Corn Leaf | Dandelion Leaf |
| 1 | 3% | 70 | 32 | 16 | 163 | 65 | 26 |
| 2 | 3% | 40 | 105 | 41 | 24 | 266 | 97 |
| 5 | 0.6% | 29 | 51 | 16 | 9 | 105 | 19 |
| 8 | 0.6% | 30 | 59 | 21 | 9 | 125 | 38 |

What is claimed is:

1. A natural composition for foliar application comprising one or more saponins extracted from a non-woody plant of the genus *Hesperaloe*, a surfactant and an active agent selected from a pesticide, insecticide, acaricide, fungicide, nematocide, disinfectant, herbicide, fertilizer, or micronutrient, wherein the one or more saponins comprise 25(27)-dehydrofucreastatin, 5(6),25(27)-disdehydroyuccaloiside C, 5(6)-disdehydroyuccaloiside C, or mixtures thereof.

2. The natural composition of claim 1 wherein the surfactant is a nonionic surfactant.

3. The natural composition of claim 2 wherein the nonionic surfactant is derived from a plant.

4. The natural composition of claim 2 wherein the nonionic surfactant is an alkyl polyglucoside.

5. The natural composition of claim 1 wherein the weight percentage of saponins extracted from *Hesperaloe* range from about 0.1 to about 10 wt % and the weight percentage of the surfactant ranges from about 0.1 to about 10 wt %.

6. The natural composition of claim 1 wherein the one or more saponins further comprise furcreastatin, yuccaloiside C, or mixtures thereof.

7. The natural composition of claim 1 wherein the non-woody plant comprises *Hesperaloe funifera, Hesperaloe nocturna, Hesperaloe parviflora, Hesperaloe chiangii*, or a mixture thereof.

8. The natural composition of claim 1 wherein the surfactant is selected from the group consisting of amine oxides, alkyl glucosides, alkyl polyglucosides, polyhydroxy fatty acid amides, alkoxylated fatty acid esters, sucrose esters, and mixtures thereof.

9. The natural composition of claim 1 wherein the active agent is a herbicide selected from the group consisting of acetyl CoA carboxylase (ACCase) inhibitors, enolpyruvyl shikimate-3-phosphate synthase (EPSPS) inhibitors, glutamine synthetase inhibitors, auxins, photosystem I (PS I) inhibitors, photosystem II (PS II) inhibitors, acetolactate synthase (ALS) or acetohydroxy acid synthase (AHAS) inhibitors, mitosis inhibitors, protoporphyrinogen oxidase (PPO) inhibitors, cellulose inhibitors, oxidative phosphorylation uncouplers, dihydropteroate synthase inhibitors, fatty acid and lipid biosynthesis inhibitors, auxin transport inhibitors and carotenoid biosynthesis inhibitors, salts and esters thereof, racemic mixtures and resolved isomers thereof, and mixtures thereof.

* * * * *